H. H. WILBURN.
LOCKING MECHANISM FOR LEVERS.
APPLICATION FILED MAY 27, 1910.
992,623.
Patented May 16, 1911.
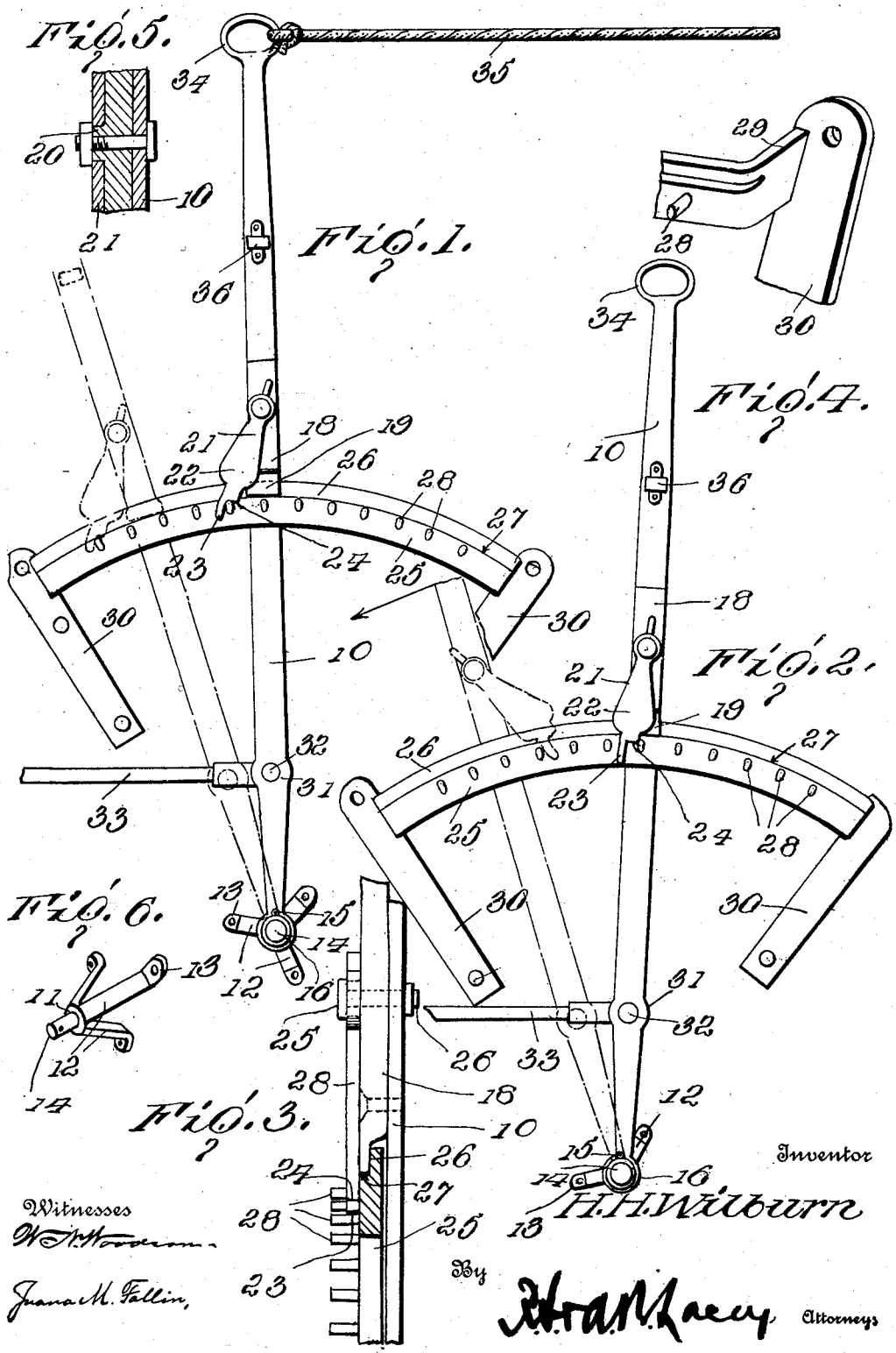

UNITED STATES PATENT OFFICE.

HUGH H. WILBURN, OF CONDON, OREGON.

LOCKING MECHANISM FOR LEVERS.

992,623. Specification of Letters Patent. Patented May 16, 1911.

Application filed May 27, 1910. Serial No. 563,815.

*To all whom it may concern:*

Be it known that I, HUGH H. WILBURN, citizen of the United States, residing at Condon, in the county of Gilliam and State of Oregon, have invented certain new and useful Improvements in Locking Mechanism for Levers, of which the following is a specification.

This invention relates to mechanical elements and refers particularly to an improved pawl mechanism for locking levers in adjusted positions.

The invention has for another object to provide an operating lever with means for locking the same in any desired position, and for releasing the lever from such position, through the use of a flexible connection, as a rope or the like. This feature of the invention adapts the improved mechanism particularly to wagon brake levers wherein the driver, riding upon one of the draft animals, may control the operation of the brake by drawing upon a rope.

Another object of the invention is to provide an operating lever with a pawl which is automatic in its movement to lock and to release the lever at the will of the operator. The pawl is so formed and mounted upon the lever, that no thumb lever, connecting rod or spring is necessary for releasing and locking the same.

The invention further aims to provide a lever with means whereby it may be operated by a rope from a distance, or may be operated directly by hand or foot, and further; to form a lever which may be applied to connecting rods which are adapted to be moved longitudinally, and which are connected to any mechanism to be operated thereby.

For a full understanding of the invention reference is to be had to the following description and accompanying drawing in which:

Figure 1 is a side elevation of the lever and its attachments disclosed in a locked position. Fig. 2 is a similar view disclosing the lever released, the dotted line indicating the position of the lever during its backward movement. Fig. 3 is an edge elevation of the lever disclosing the strip in section and parts of the same broken away. Fig. 4 is a detail view of one of the supports for the arcuate strip. Fig. 5 is a longitudinal section through the lever and adjacent parts for supporting the pawl. Fig. 6 is a perspective view of the support employed.

Corresponding and like parts are referred to in the following description and indicated in all the views of the drawing by the same reference characters.

Referring to the drawing the numeral 10 designates a lever which is pivotally mounted at its lower extremity upon a horizontal support. The support comprises a circular head 11 having inwardly diverging legs 12, which carry upon their free ends outturned flanges 13 for engagement against a suitable device for holding the support in position. The head 11 is provided with an outstanding stud 14 which is suitably apertured at its outer end for the reception of a cotter pin 15. The lever 10 is formed of a flattened and elongated bar which is slightly enlarged at its lower end, as at 16, the enlargement 16 being centrally apertured for the loose reception of the stud 14 therethrough. A washer 17 is engaged over the outer end of the stud 14 between the enlargement 16 and the cotter pin 15 for the purpose of snugly holding the lever 10 upon the support. The lever 10 carries, at a point midway of its extremities a guard 18, which is in the form of a flattened bar of a width corresponding to the lever 10, and which tapers inwardly at its upper extremity. The lower end of the guard 18 is provided with a depending lip 19 at its outer edge which is spaced from the lever 10 for a purpose hereinafter set forth. The guard 18 is provided at its central portion with a boss 20 forming a suitable bearing to support a locking pawl 21. The boss 20 is formed upon the outer face of the guard 18, and the pawl 21 is loosely positioned thereover for sliding engagement against the outer face of the guard 18.

The pawl 21 is in the form of a strip of metal suitably apertured at its upper end to receive the boss 20 therethrough, the lower end of which is enlarged edgewise, as at 22, to add weight to such end of the pawl to insure the hanging of the same in a substantially vertical plane. The pawl 21 is provided at its forward edge with a depending finger 23, the upper end of which terminates at its inner side in a concave shoulder 24.

A segment 25 is carried against the outer face of the lever having an upstanding flange 26 to fit beneath the lip 19. The shoulder 27, formed at the juncture between the flange 26 and the segment 25, rests loosely against the lower edge of the lip 19. The lip 19 serves the function of holding the lever 10 in an upright position and against the inner side of the segment 25. The guard 18 is of a thickness sufficient to dispose the pawl 21 against the outer face of the segment 25. The segment 25 carries a plurality of spaced and outstanding teeth 28, which are preferably formed with flattened sides to receive the finger 23 thereagainst during the operation of the lever 10. The segment 25 is formed of a flattened arcuate bar which is turned inwardly at its opposite ends to form supporting arms 29, which are carried upon the upper ends of base plates 30. The base plates 30, the arms 29, and the segment 25 are preferably integrally cast, and having formed thereon the flange 26 and the spaced teeth 28. Other means of manufacturing these elements may be employed without departing from the spirit of the invention. The lever 10 is provided with an enlargement 31 which is formed at a point substantially midway between the lower extremity of the lever and the guard 18, the enlargement 31 being apertured for the reception of a bolt 32, which carries the forward end of a connecting rod 33. The connecting rod 33 is attached to any suitable mechanism which is to be operated by the lever 10. The upper extremity of the lever 10 is provided with an eye 34 through which is secured one end of a cable 35. The lever 10 is also provided with a foot rest 36, which is positioned against one side of the lever at a point spaced above the guard 18.

The lever 10 is disclosed in Fig. 1 in a locked position. In this position it is assumed that the mechanism which is attached to the connecting rod 33 is exerting a constant tension upon the lever 10 to throw the same backwardly and in the position disclosed in dotted lines in Fig. 1. This locked position of the lever 10 is had by the seating of the shoulder 24 upon one of the teeth 28, the pawl 21 being swung backwardly from the lip 19. To release the lever 10 the same is drawn forwardly a slight distance or into the position disclosed in Fig. 2 in full lines wherein the pawl 21 is raised out of engagement with the tooth 28, and the finger 23 rides over the tooth and falls between such tooth and the adjacent forward tooth. The pawl 21 is thus released and the lever 10 is permitted to swing backwardly. The backward movement of the lever swings the pawl 21 into a forward position as is disclosed in dotted lines in Fig. 2, whereupon the forward edge of the finger 23 strikes the teeth 28 and rides loosely thereover. By this operation the lever 10 is adjusted and locked in position by the forward movement of the same, and is also released from the teeth 28 by a slight forward movement of the lever. This movement can readily be effected through the medium of the cable 35 and at a considerable distance from the lever 10. The foot rest 36 admits of the adjustment of the lever 10 by the foot of the operator, as pressure is exerted only in a forward direction upon the lever 10.

Having thus described the invention, what is claimed as new is:

1. A lever mechanism including a pivoted lever, a segment carried against one side of the lever and having a plurality of spaced and outwardly extending teeth, a guard carried by the lever and having a lip engaging over the upper edge of the segment, a hinged pawl carried by the guard to slide over the outer face of the segment, said pawl having a depending finger at the inner edge thereof engaging between the teeth, said pawl also having a concave shoulder at the upper termination of said finger and at the forward edge of the pawl, and operating means connected to the lever.

2. A lever mechanism including a segment having a plurality of outstanding teeth, a lever pivoted concentric to the segment and passed upwardly against the inner face thereof, and a pawl carried in spaced relation against the outer sides of said lever for sliding engagement against the outer face of said segment, said pawl having a depending finger engaging between the teeth and a concave shoulder at one side and at the inner end of the pawl.

3. A lever locking mechanism including a segment having a plurality of spaced and outstanding teeth, a lever pivoted concentric to the segment and passing upwardly against the inner face thereof, a guard carried upon the central portion of the lever and having a depending lip for engagement over the upper edge of the segment, and a hinged pawl carried against the outer face of the guard and having a depending finger engaging between the teeth and a concave shoulder at the inner end of the finger to receive the teeth.

4. A lever locking mechanism including a segment having spaced and outstanding teeth and an upwardly extending flange along its inner edge, a lever pivoted concentric to the segment and passing upwardly against the inner face thereof, a guard carried by the lever and having a depending lip for engagement over the upper edge of the flange, a pawl hinged against the outer face of the guard and having a depending finger for engagement over the teeth and a shoulder for the reception of the teeth.

5. A lever locking mechanism including a segment having an upturned flange at its inner edge and spaced outstanding teeth, a lever pivoted concentric to the segment and passing upwardly against the inner face thereof, a guard carried by the lever and having a depending lip for engagement over the flange, a pawl hinged against the outer face of the guard to loosely slide over the segment, said pawl having a finger to ride over the teeth and a shoulder to engage with the teeth, and operating means carried by the lever for moving the same to interlock said pawl with the teeth.

6. A lever locking mechanism including a segment having spaced teeth, a lever pivoted concentric to the segment, a hinged pawl depending from the lever and riding over the teeth of the segment, said pawl having a shoulder engaging with the teeth of the segment when the pawl is swung backwardly, and a downwardly projecting finger adjacent to the shoulder for holding the shoulder from the teeth when the pawl is swung forwardly.

7. A lever locking mechanism including a segment having spaced teeth, a lever pivoted concentric to the segment, and a hinged pawl depending from the lever and riding over the teeth, said pawl having a shoulder formed upon its lower end and at its forward edge to engage with the teeth and a depending finger upon its lower end adjacent to the shoulder for holding the same from engagement with the teeth at times.

In testimony whereof I affix my signature in presence of two witnesses.

HUGH H. WILBURN. [L. S.]

Witnesses.
 WAYFE HOCKETT,
 JAY BOWERMAN.

---

Copies of this patent may be obtained for five cents each, by addressing the "Commissioner of Patents, Washington, D. C."